United States Patent
Lee et al.

(10) Patent No.: US 8,916,104 B2
(45) Date of Patent: Dec. 23, 2014

(54) EXHAUST GAS DENITRIFYING SYSTEM HAVING NOISE-REDUCTION STRUCTURE

(75) Inventors: Soo-Tae Lee, Busan (KR); Ok-Ryeol Song, Gyeongsangnam-do (KR); Chang-Won Lee, Gyeongsangnam-do (KR); Ha-Geun Kang, Busan (KR)

(73) Assignee: Panasia Co., Ltd., Busan (KR)

( * ) Notice: Subject to any disclaimer, the term of this patent is extended or adjusted under 35 U.S.C. 154(b) by 627 days.

(21) Appl. No.: 13/220,303

(22) Filed: Aug. 29, 2011

(65) Prior Publication Data

US 2012/0224998 A1    Sep. 6, 2012

(30) Foreign Application Priority Data

Mar. 2, 2011 (KR) .......................... 10-2011-0018350

(51) Int. Cl.
| | |
|---|---|
| *B01D 53/56* | (2006.01) |
| *B01D 53/94* | (2006.01) |
| *F01N 3/28* | (2006.01) |
| *B01D 53/86* | (2006.01) |
| *F01N 3/20* | (2006.01) |
| *F01N 1/10* | (2006.01) |
| *F01N 13/00* | (2010.01) |
| *F01N 3/30* | (2006.01) |

(52) U.S. Cl.
CPC ........ *B01D 53/8631* (2013.01); *B01D 53/8696* (2013.01); *F01N 3/2066* (2013.01); *F01N 3/2828* (2013.01); *F01N 3/2892* (2013.01); *F01N 1/10* (2013.01); *F01N 13/0097* (2013.01); *F01N 3/2885* (2013.01); *B01D 2251/2067* (2013.01); *F01N 2230/04* (2013.01); *F01N 2330/06* (2013.01); *F01N 2330/32* (2013.01); *F01N 2570/14* (2013.01); *F01N 2610/02* (2013.01); *F01N 3/30* (2013.01); *F01N 2240/20* (2013.01); *F01N 2330/325* (2013.01); *Y02T 10/24* (2013.01)
USPC .............................. 422/180; 60/301; 181/257

(58) Field of Classification Search
CPC ............ B01D 53/8631; B01D 53/8696; F01N 2230/04; F01N 1/10; F01N 3/2066; F01N 3/2828; F01N 3/2892; F01N 13/0097
USPC ............ 422/168, 169, 172, 177, 180; 60/299, 60/301; 181/227, 228, 252, 257, 264, 284, 181/290
See application file for complete search history.

(56) References Cited

U.S. PATENT DOCUMENTS

| | | | | |
|---|---|---|---|---|
| 2,281,963 | A | * | 5/1942 | van Tongeren ............... 181/257 |
| 3,597,165 | A | * | 8/1971 | Keith et al. .................. 422/180 |
| 5,456,533 | A | * | 10/1995 | Streiff et al. .................. 366/337 |
| 6,312,650 | B1 | * | 11/2001 | Frederiksen et al. ......... 422/180 |
| 2010/0212301 | A1 | * | 8/2010 | De Rudder et al. ............. 60/299 |

* cited by examiner

*Primary Examiner* — Jill Warden
*Assistant Examiner* — Joye L Woodard
(74) *Attorney, Agent, or Firm* — Workman Nydegger

(57) ABSTRACT

An exhaust gas denitrifying system having a noise-reduction structure includes a reactor in which a chemical reaction that converts nitrogen oxides included in exhaust gas into nitrogen by denitrifying the nitrogen oxides using a catalyst takes place. The reactor includes a catalytic filter unit coated with a catalyst and provided with a plurality of through-holes through which exhaust gas passes; and a noise-reducing unit for removing noise from the exhaust gas denitrified by the catalytic filter unit. The reactor denitrifies the nitrogen oxides, and simultaneously reduces the noise, thus reducing the size of the exhaust gas denitrifying system.

7 Claims, 13 Drawing Sheets

EXHAUST GAS DENITRIFYING SYSTEM HAVING NOISE-REDUCTION STRUCTURE

CROSS-REFERENCE TO RELATED APPLICATIONS

This application claims priority to Korean Application No. 10-2011-0018350, filed on Mar. 2, 2011, which is incorporated herein by reference.

BACKGROUND OF THE INVENTION

1. Technical Field

The present invention relates to an exhaust gas denitrifying system having a noise-reduction structure, and, more particularly, to an exhaust gas denitrifying system having a noise-reduction structure, including a reactor in which a chemical reaction of converting nitrogen oxides included in exhaust gas into nitrogen by nitrifying the nitrogen oxides using a catalyst takes place.

2. Description of the Related Art

The exhaust gas discharged from engines for thermoelectric power plants, ships and the like that use fossil fuels as energy sources includes a large amount of nitrogen oxides ($NO_x$). Nitrogen oxides are known to cause acid rain and respiratory disease. Therefore, various technologies for removing nitrogen oxides from exhaust gas have been developed. Further, when noises generated by the operation of engines and by the flow of exhaust gas are directly discharged to the external environment together with the exhaust gas, they destroy the external environment and become a target for public grievance. Therefore, technologies for reducing these noises have been developed.

FIG. 1 is a block diagram of a conventional exhaust gas denitrifying system using selective catalytic reduction (SCR), including a silencer for reducing noise. Referring to FIG. 1, in the conventional exhaust gas denitrifying system, exhaust gas discharged from an engine passes through a silencer 11 to reduce noise, and is then introduced into a mixing chamber 12 to be mixed with a reductant supplied by a reductant supply unit 13, and then the exhaust gas mixed with the reductant is introduced into a reactor 14 to be denitrified by a catalyst, thereby removing nitrogen oxides from the exhaust gas.

However, since the noises generated by the operation of the engine and by the flow of exhaust gas are reduced only by the silencer 11, it is required to make a large silencer 11 in order to improve the noise-reducing effect. Therefore, there is a problem in that the exhaust gas denitrifying system must be large-sized as well.

Meanwhile, the denitrification of exhaust gas by a catalyst is easily conducted at a high temperature of about 400° C. and high pressure. However, in the conventional exhaust gas denitrifying system, since the exhaust gas which has had its noise reduced by the silencer 11 sequentially passes through the mixing chamber 12 and the reactor 14 to be denitrified, and, as a result, the exhaust gas, temperature and pressure thereof are decreased by the silencer 11 before the gas is denitrified. Therefore, there is a problem in that the denitrification efficiency thereof is lowered.

Further, since the pressure of exhaust gas drops greatly while passing through the silencer 11, the output of an engine must be increased in order to easily discharge the exhaust gas. Therefore, there is a problem in that the consumption of fuel increases, and the efficiency of the engine decreases.

SUMMARY OF THE INVENTION

Accordingly, the present invention has been devised to solve the above-mentioned problems, and an object of the present invention is to provide an exhaust gas denitrifying system having a noise-reduction structure, which can denitrify exhaust gas and reduce noise using one reactor without providing a silencer.

Another object of the present invention is to provide an exhaust gas denitrifying system having a noise-reduction structure, in which a catalytic filter unit in a reactor can reduce noise to some degree, so that the size of a noise-reducing unit can be decreased, with the result that the size of the reactor can be remarkably decreased compared to the size of a silencer of the conventional exhaust gas denitrifying system, thereby decreasing the size of the exhaust gas denitrifying system.

Still another object of the present invention is to provide an exhaust gas denitrifying system having a noise-reduction structure, in which side walls forming through-holes of a catalytic filter unit are formed in a wave shape, so that the space of the through-holes can be enlarged while maintaining the contact area between exhaust gas and a catalyst, thereby increasing a noise-reducing effect while minimizing the pressure drop of the exhaust gas.

Still another object of the present invention is to provide an exhaust gas denitrifying system having a noise-reduction structure, in which a plurality of partitions are disposed at the rear side of the catalytic filter unit in the reactor at regular intervals in a direction parallel to the flow of exhaust gas, so that the flow of the exhaust gas denitrified by the catalytic filter unit can be dispersed and the noise of the exhaust gas can be reduced, thereby increasing a noise-reducing effect.

Still another object of the present invention is to provide an exhaust gas denitrifying system having a noise-reduction structure, in which the denitrification reaction of exhaust gas is conducted prior to the reduction of noise unlike the conventional exhaust denitrifying system, so that high-temperature and high-pressure exhaust gas is denitrified, thereby improving the denitrification efficiency of exhaust gas.

Still another object of the present invention is to provide an exhaust gas denitrifying system having a noise-reduction structure, in which noise is partially reduced by a catalytic filter unit and then additionally reduced by a noise-reducing unit, so that the size of the exhaust gas denitrifying system can be decreased, with the result that the pressure drop of the exhaust gas passing through the exhaust gas denitrifying system can be minimized, thereby increasing the efficiency of an engine and decreasing the consumption of fuel.

Still another object of the present invention is to provide an exhaust gas denitrifying system having a noise-reduction structure, which can overcome the problem of the conventional exhaust gas denitrifying system in that the length of the mixing chamber thereof must be kept long in order to secure the time and length sufficient for mixing a reductant with exhaust gas after spraying the reductant, and in which the reductant can be mixed with exhaust gas within a short period of time, so that the length of the mixing chamber can be shortened, thereby efficiently maintaining the entire area of the exhaust gas denitrifying system.

In order to accomplish the above objects, an aspect of the present invention provides an exhaust gas denitrifying system having a noise-reduction structure, including: a reactor in which the chemical reaction that converts nitrogen oxides included in exhaust gas into nitrogen by denitrifying the nitrogen oxides using a catalyst takes place, the reactor including: a catalytic filter unit coated with a catalyst and provided with a plurality of through-holes through which exhaust gas passes; and a noise-reducing unit for removing noise from the exhaust gas denitrified by the catalytic filter unit, whereby the reactor denitrifies the nitrogen oxides, and simultaneously reduces the noise, thus reducing the size of the exhaust gas denitrifying system.

Here, the catalytic filter unit may include wave-shaped side wall forming the through-holes, whereby the contact area between exhaust gas and a catalyst is maintained, and simultaneously the space of the through-holes is enlarged, thus increasing a noise-reducing effect while minimizing the pressure drop of exhaust gas.

Further, the noise-reducing unit may include a plurality of partitions disposed at a rear side of the catalytic filter unit in the reactor at regular intervals in parallel to the flow of the exhaust gas, wherein the plurality of partitions disperse the flow of the exhaust gas denitrified by the catalytic filter unit and absorb noise to improve the effect of reducing noise.

Further, each of the partitions may include: a noise-absorbing member for absorbing noise; and support plates disposed on both sides of the noise-absorbing member to support the noise-absorbing member and provided with a plurality of holes.

Further, each of the partitions may have a semicircular or triangular front end to minimize the pressure drop of the denitrified exhaust gas introduced into the noise-reducing unit.

Further, the noise-absorbing member may be made of mineral wool.

Further, the reactor may further include a noise-absorbing material layer disposed in front of the catalytic filter unit and formed to a predetermined thickness along an inner surface of the reactor.

The exhaust gas denitrifying system having a noise-reduction structure may further include: a mixing chamber for mixing a reductant with exhaust gas and supplying the mixed gas to the reactor, wherein the mixing chamber includes a multiplex mixer for mixing the reductant with the exhaust gas within a short period of time, wherein the multiplex mixer includes a first mixer and a second mixer, each of which is provided with a plurality of flow control plates, and the plurality of flow control plates include upstream flow control plates inclined upwards and downstream flow control plates inclined downwards, which are repetitively arranged.

Here, the multiplex mixer may include a first mixer module and a second mixer module, each of which is formed by connecting the first mixer with the second mixer, wherein, in each of the first mixer module and the second mixer module, the flow control plates of the first mixer face the flow control plates of the second mixer, and are disposed at a slant in a direction opposite to those of the second mixer.

Further, each of the flow control plates may be provided with a plurality of center holes through which a laminar flow advances in a straight line, whereby the laminar flow is mixed with an eddy flow advancing in a curved line through the flow control plates, thus increasing the mixing efficiency of a reductant and the exhaust gas.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
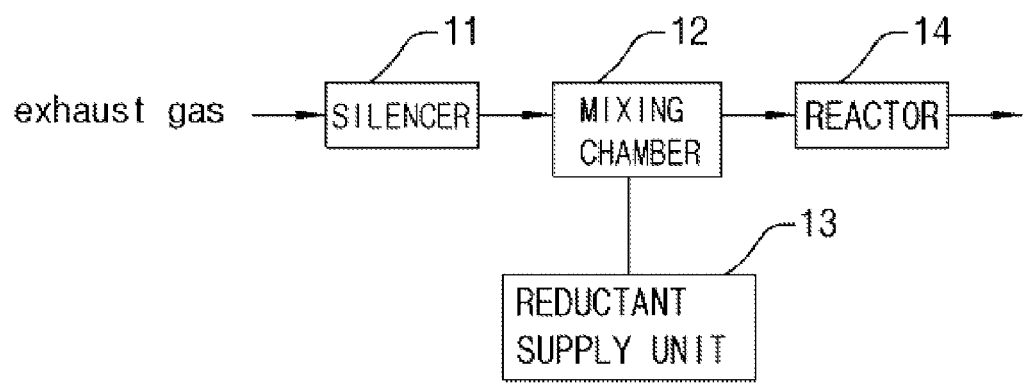
FIG. 1 is a block diagram of a conventional exhaust gas denitrifying system.
Figure 2:
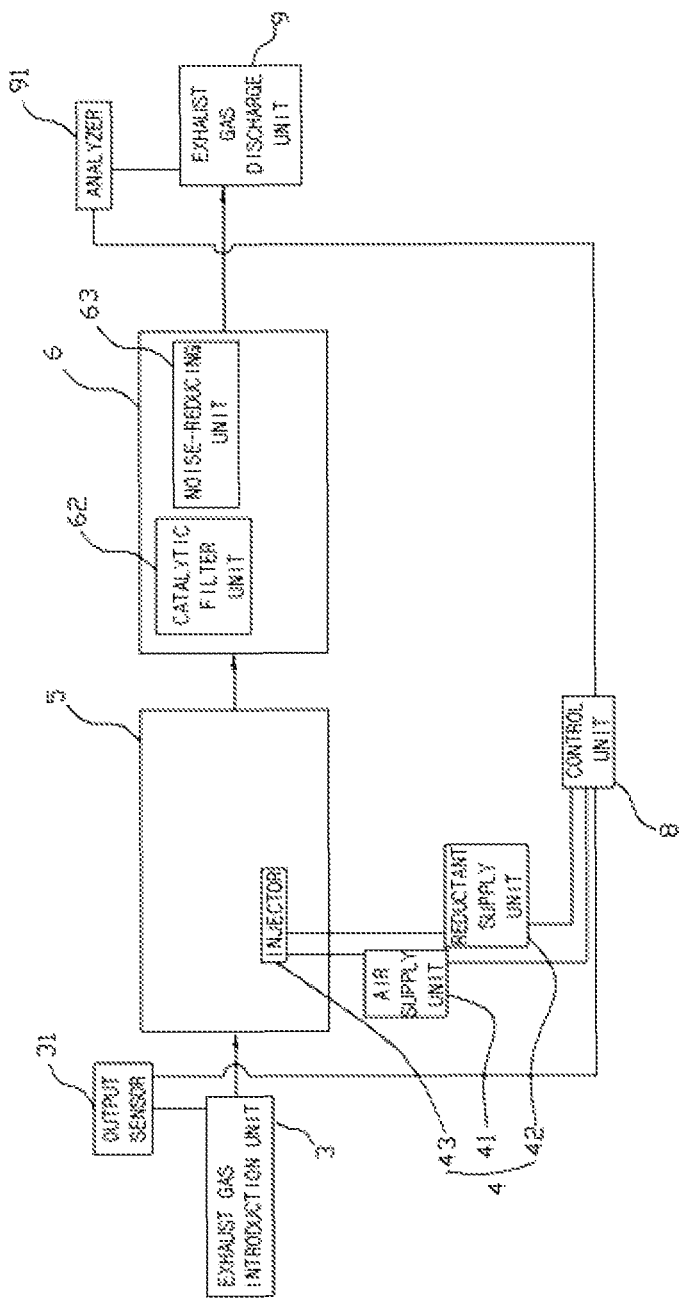
FIG. 2 is a block diagram of an exhaust gas denitrifying system having a noise-reduction structure according to an embodiment of the present invention.
Figure 3:
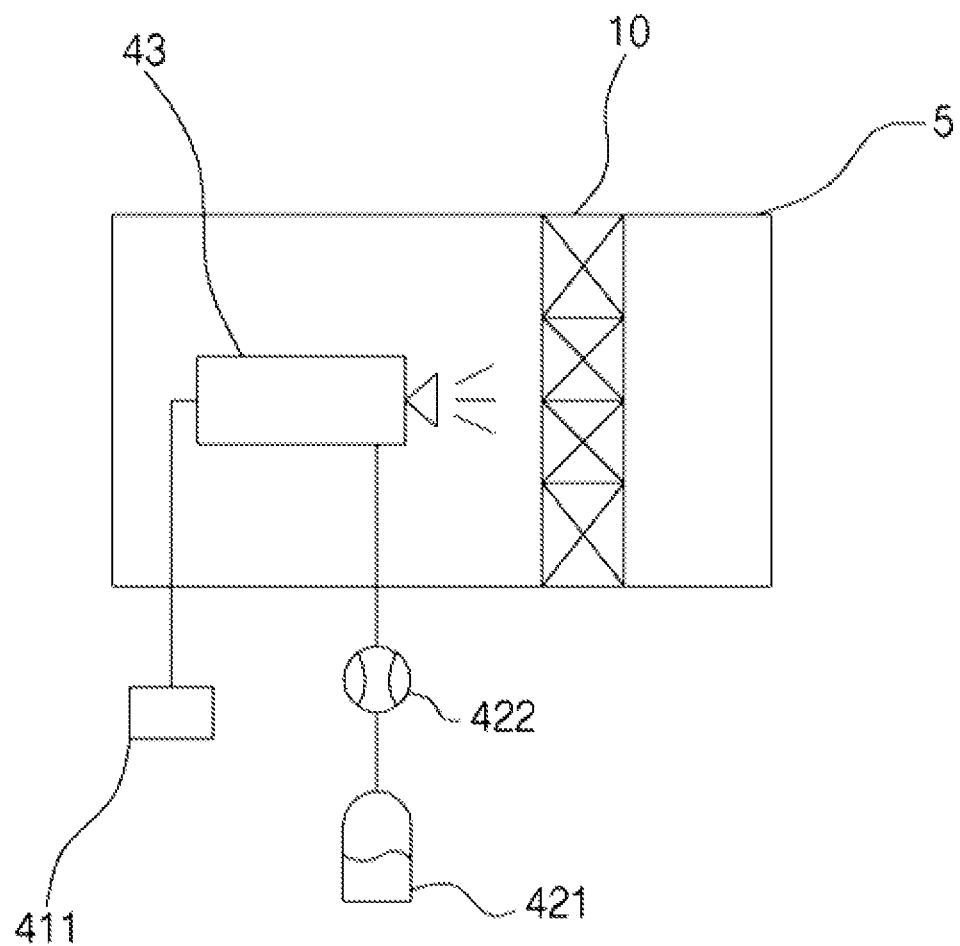
FIG. 3 is a schematic view explaining a reductant injecting unit and a mixing chamber used in the exhaust gas denitrifying system having a noise-reduction structure according to an embodiment of the present invention.
Figure 4:
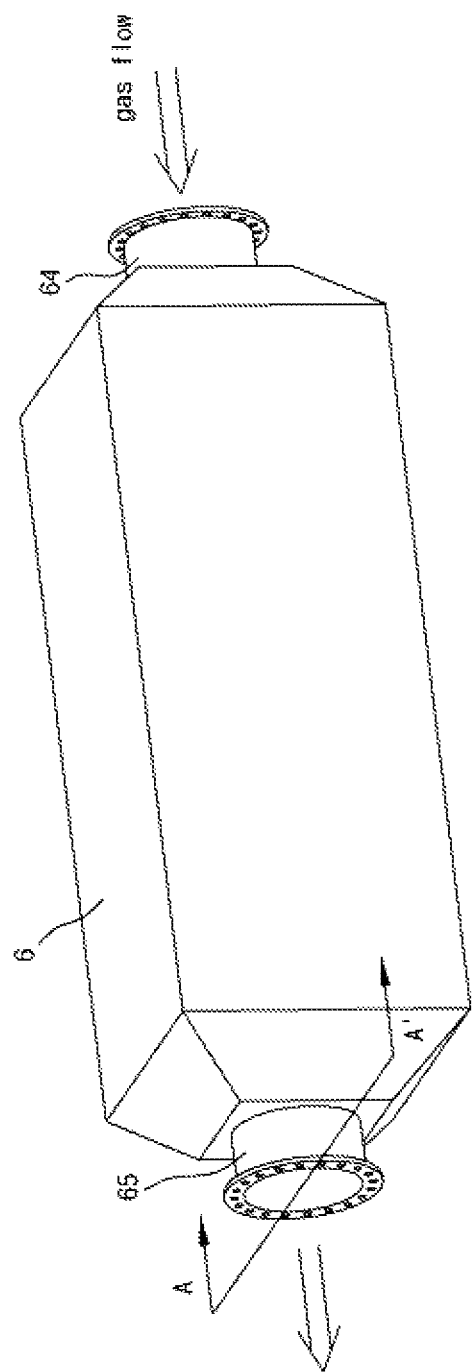
FIG. 4 is a perspective view of a reactor used in the exhaust gas denitrifying system having a noise-reduction structure according to an embodiment of the present invention.
Figure 5:
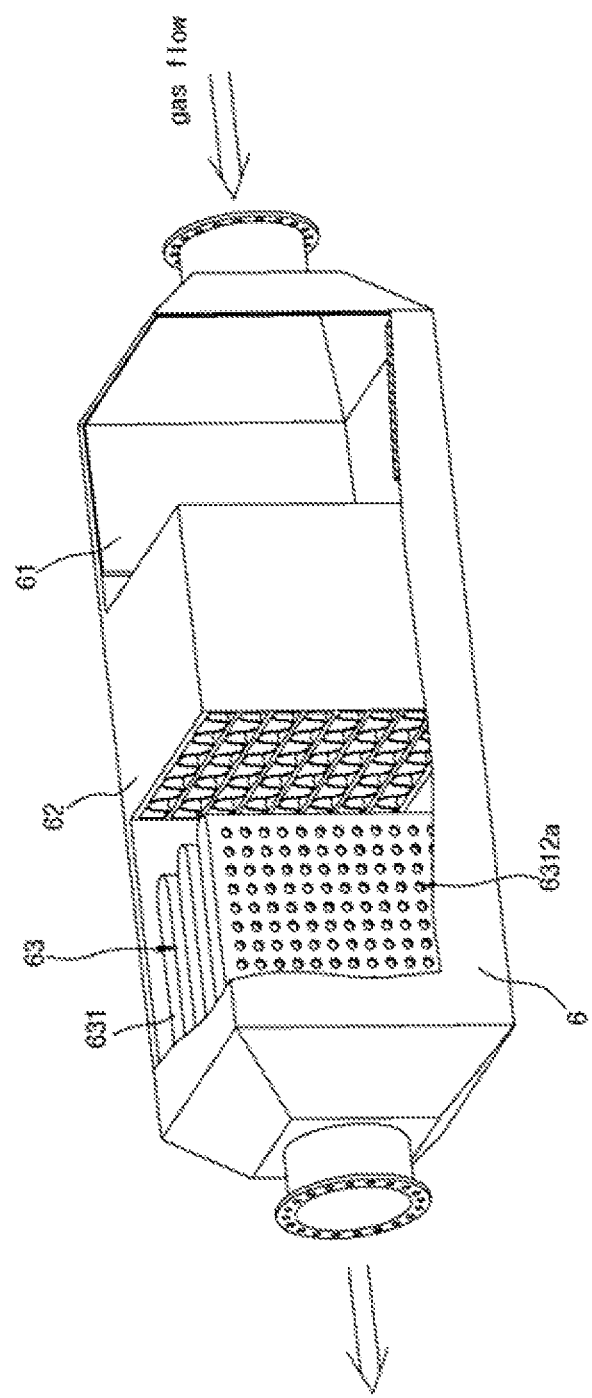
FIG. 5 is a partially-cut perspective view of the reactor used by the exhaust gas denitrifying system having a noise-reduction structure according to an embodiment of the present invention.
Figure 6B:
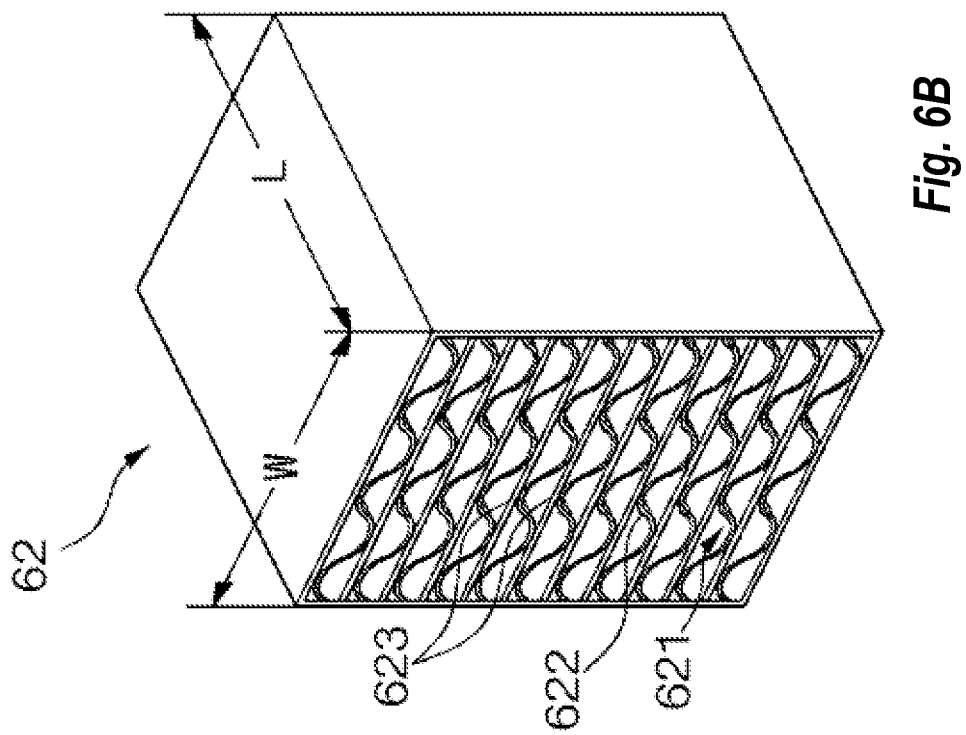
FIGS. 6A and 6B are a perspective views of catalytic filter units used in the exhaust gas denitrifying system having a noise-reduction structure according to an embodiment of the present invention.
Figure 6A:
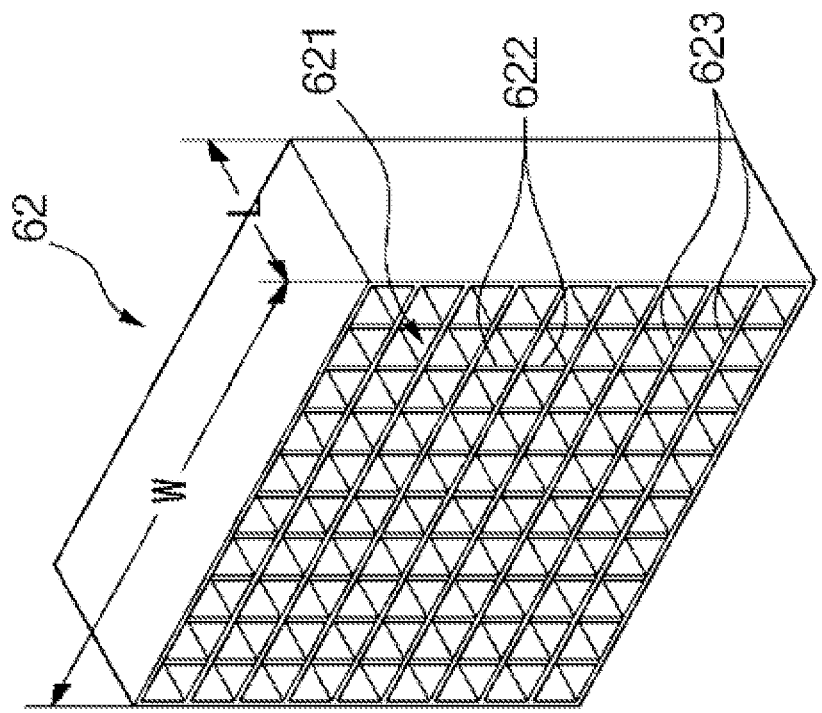
Figure 7B:
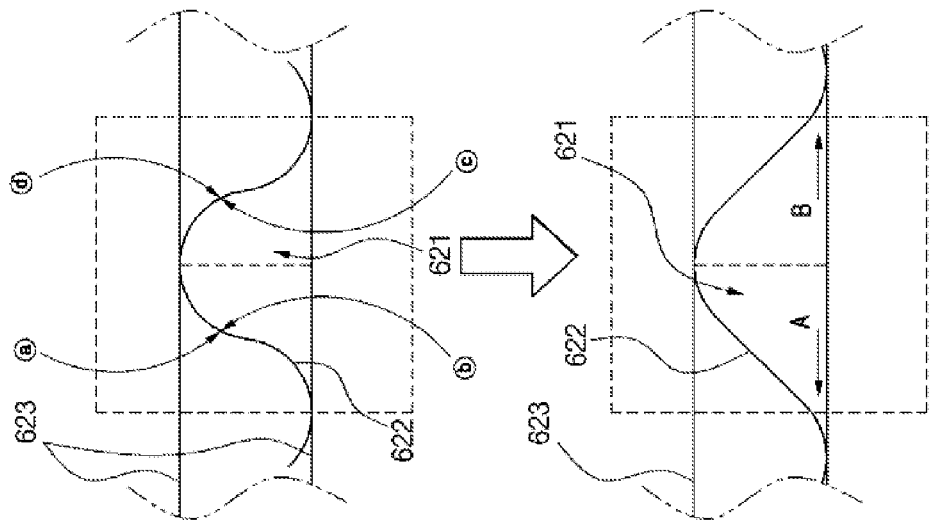
FIGS. 7A and 7B are partially-sectional views of the catalytic filter units used in the exhaust gas denitrifying system having a noise-reduction structure according to an embodiment of the present invention.
Figure 7A:
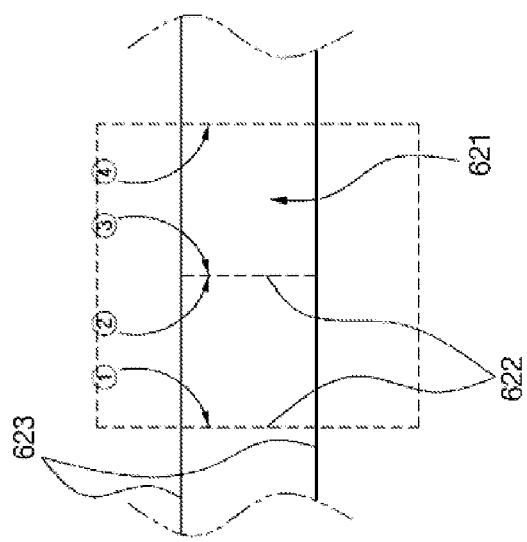
Figure 8:
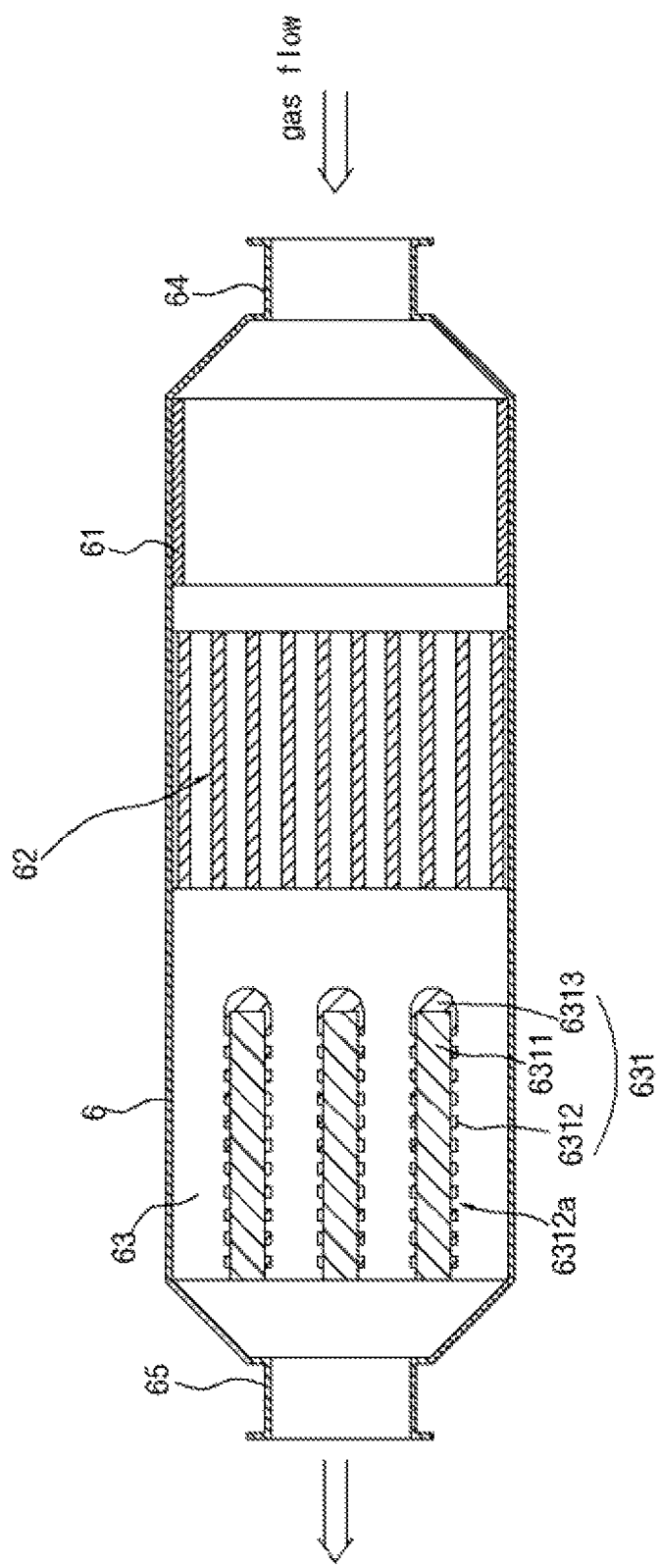
FIG. 8 is a sectional view of the reactor taken along the line A-A' of FIG. 4.

FIG. 2 is a block diagram of an exhaust gas denitrifying system having a noise-reduction structure according to an embodiment of the present invention, FIG. 3 is a schematic view explaining a reductant injecting unit and a mixing chamber used in the exhaust gas denitrifying system having a noise-reduction structure according to an embodiment of the present invention, FIG. 4 is a perspective view of a reactor used in the exhaust gas denitrifying system having a noise-reduction structure according to an embodiment of the present invention, FIG. 5 is a partially-cut perspective view of the reactor used in the exhaust gas denitrifying system having a noise-reduction structure according to an embodiment of the present invention, FIGS. 6A and 6B are a perspective views of catalytic filter units used in the exhaust gas denitrifying system having a noise-reduction structure according to an embodiment of the present invention, FIGS. 7A and 7B are partially-sectional views of the catalytic filter units used in the exhaust gas denitrifying system having a noise-reduction structure according to an embodiment of the present invention, and FIG. 8 is a sectional view of the reactor taken along the line A-A' of FIG. 4.

Referring to FIGS. 2 to 8, the exhaust gas denitrifying system having a noise-reduction structure according to an embodiment of the present invention includes an exhaust gas introduction unit 3, a reductant injecting unit 4, a mixing chamber 5, a reactor 6, a control unit 8, and an exhaust gas discharge unit 9.

The exhaust gas introduction unit 3 is configured such that gas or fluid (hereinafter referred to as "exhaust gas") including nitrogen oxides discharged from LNG dischargers for medium and small cogeneration power plants, engines for thermal power generation, engines for ships, etc. is introduced into the mixing chamber 5 through the exhaust gas introduction unit 3, and is provided with an output sensor 31.

The output sensor 31 is connected to one side of the exhaust gas introduction unit 3, and serves to detect information about the amount of exhaust gas and to transfer this information to the control unit 8. Here, since the amount of nitrogen oxide included in exhaust gas is determined by the amount of exhaust gas introduced into the mixing chamber through the exhaust gas introduction unit 3, the output sensor 31 transfers the information, such as RPM, current flow, outlet temperature or the like, which can be used to determine the amount of exhaust gas, to the control unit 8, and then the control unit 8 controls the amount of a reductant such that the amount of reductant supplied to the mixing chamber 5 is able to sufficiently denitrify nitrogen oxides included in the exhaust gas.

The reductant injecting unit 4 serves to supply a reductant into the mixing chamber 5, and includes an air supply unit 41, a reductant supply unit 42 and an injector 43.

The air supply unit 41 serves to provide external air to the injector 43, and is controlled by the control unit 8. The air supply unit 41 includes an air pressing unit 411 that causes airflow such that air is supplied to the injector 43. For example, a blower, a compressor or the like may be used as the air pressing unit 411.

The reductant supply unit 42 serves to provide a reductant to the injector 43, and is controlled by the control unit 8. The reductant supply unit 42 includes a reductant storage tank 421 and a flow control pump 422. The reductant storage tank 421 stores a reductant, may be formed in various shapes, such as a cylinder, a rectangle and the like, and may be formed using various materials such as SUS 304, SPV 300 and the like, in various sizes and various volumes. A urea aqueous solution or the like may be used as the reductant. The flow control pump 422, one end of which is connected to the output end of the reductant storage tank 421, serves to supply the reductant to the injector 43, and can control the supply of the reductant by adjusting the intensity of output under the control of the control unit 8. For example, the model "YAD-12211(½")", manufactured by Daelim Integrated Instruments Corporation, made of SCS13 (body) and SUS316 (trim) and having a flow rate of 5.7~85 L/min, may be used as the flow control pump 422.

The injector 43 is connected to the air supply unit 41 and the reductant supply unit 42, and serves to inject the supplied air and reductant into the mixing chamber 5. The injector 43 is connected to the output end of the air pressing unit 411 and the output end of the flow control pump 422. For example, the wide-angle circular injection nozzle (setup number: 26) having an injection rate of 33 L/hr and made of SUS304, manufactured by Spraying Systems Co. Korea, may be used as the injector 43.

The mixing chamber 5 serves to produce a mixed gas by mixing the exhaust gas introduced through the exhaust gas introduction unit 3 with the reductant injected by the injector 43. For example, when a urea aqueous solution is used as the reductant, the urea aqueous solution injected by the injector 43 is mixed with high-temperature exhaust gas to be supplied with heat from the high-temperature exhaust gas, and is thus converted into ammonia gas according to the following reaction formula, and thus a mixed gas of ammonia gas and exhaust gas is supplied to the reactor 6.

$$xH_2O + CO(NH_2)_2 \rightarrow 2NH_3 + CO_2 + (x-1)H_2O$$

In this case, since predetermined space and time are required in order to mix the reductant injected by the injector 43 with exhaust gas in the mixing chamber 5, there is a problem in that the size of the mixing chamber 5 must become large and thus it is difficult to optimize the space of the mixing chamber 5. Therefore, in the present invention, in order to overcome the above problem, a multiplex mixer 10 is used. The multiplex mixer 10 will be described later.

The reactor 6 serves to denitrify nitrogen oxides (NOx) included in the mixed gas of a reductant and exhaust gas into harmless components and to reduce noise, and includes a noise-absorbing material layer 61, a catalytic filter unit 62 and a noise-reducing unit 63. The reactor 6 has a predetermined shape, preferably, a square cylinder. The reactor 6 is provided at the upper and lower ends thereof with an inlet pipe 64 and an outlet pipe 65 having a smaller diameter than that of the reactor 6, respectively. Since the diameter of the inlet pipe 64 is smaller than that of the reactor 6, the mixed gas introduced into the reactor through the inlet pipe 64 expands, so that sound wave energy decreases, thereby reducing noise to some degree.

The noise-absorbing material layer 61 is formed to a predetermined length and thickness along the inner surface of the front side of the reactor 6, and serves to reduce the noise of the mixed gas introduced into the reactor 6 through the inlet pipe 64 to some degree. The noise-absorbing material layer 61 may be made of various materials. For example, the noise-absorbing material 61 may be made of mineral wool having excellent heat resistance and high noise-absorbing efficiency.

The catalytic filter unit 62 is disposed at the rear side of the noise-absorbing material layer 61 in the reactor 6, is coated with a catalyst, and is provided with a plurality of through-holes 621 through which the mixed gas passes. While the mixed gas introduced into the reactor passes through the catalytic filter unit 62, nitrogen oxides (NO$_x$) included in the mixed gas are converted into nitrogen by the denitrification reaction using a catalyst. That is, nitrogen oxides (NO$_x$) included in the mixed gas are converted into harmless components according to the following reaction formulae using the action of a catalyst.

$$4NO + 4NH_3 + O_2 \rightarrow 4N_2 + 6H_2O$$

$$2NO_2 + 4NH_3 + O_2 \rightarrow 3N_2 + 6H_2O$$

Here, various products may be used as the catalyst. For example, products, each including a catalyst activator selected from oxides of V, Rh, Mo, W, Cu, Ni, Fe, Cr, Mn, Sn, etc., sulfates, rare-earth oxides, precious metals, and the like; and a catalyst carrier such as Al$_2$O$_3$, TiO$_2$, active carbon, zeolite, silica, or the like, may be used as the catalyst. Among these products, currently, a V$_2$O$_5$ (vanadium pentoxide) based catalyst, a MoO$_3$ (molybdenum troxide) based catalyst and a WO$_3$ (tungsten trioxide) based catalyst, each including TiO$_2$ (titanium oxide) as a carrier, are being used in practice.

Since the catalytic filter unit 62 is provided with wave-shaped side walls 622 forming the through-holes 621, the space of the through-holes 621 can be enlarged while maintaining the contact area between the mixed gas and the catalyst, thereby increasing a noise-reducing effect while minimizing pressure drop. As shown in FIG. 6A, the conventional catalytic filter unit 62 has a honeycomb structure in which a plurality of rectangular through-holes 621 are formed. In the conventional catalytic filter unit 62 having a honeycomb structure, a pressure drop phenomenon occurs after the mixed gas passes through this conventional catalytic filter unit 62. Therefore, in order to minimize the pressure drop of the mixed gas, the conventional catalytic filter unit 62 is configured such that the width (W) thereof is increased instead of decreasing the length (L) thereof. However, when the length (L) of the conventional catalytic filter unit 62 is shortened, the length along which the mixed gas comes into contact with the catalyst applied or is extruded onto the surface of the catalytic filter unit 62 is also shortened, so that the noise-reducing effect is reduced by half, thereby decreasing the amount of reduced noise. In order to overcome the above problem, as shown in FIG. 6B, the catalytic filter unit 62 of the present invention is configured such that it is provided with wave-shaped side walls 622 forming the through-holes 621. Therefore, in this catalytic filter unit 62, the contact area between the mixed gas and the catalyst is maintained, and simultaneously the sectional area of the through-holes 621 can be enlarged, so that the length (L) of the catalytic filter unit can be increased. A detailed description thereof will be given later.

The through-holes 621 is formed by dividing the interior of the catalytic filter unit 62 using upper and lower walls and side walls. The mixed gas of a reductant and exhaust gas passes through the through-holes 621. Since the catalyst is applied or extruded onto the surface of the catalytic filter unit 62, the mixed gas can come into contact with the catalyst while passing through the through-holes 621.

The side walls 622 form the through-holes 621 together with the upper and lower walls 623. As described above, the conventional catalytic filter unit 62 has a honeycomb structure in which the through-holes 621 are formed by the rectangular side walls 622, but, the catalytic filter unit 62 of the present invention is configured such that the through-holes 621 are formed by the wave-shaped side walls 622. The differences in effect between the conventional catalytic filter unit 62 and the catalytic filter unit 62 of the present invention will be described as follows.

Hereinafter, the operation and effect of the catalytic filter unit 62 depending on the structure thereof will be described in more detail.

Referring to FIGS. 6A to 7B, as described above, since the catalytic filter unit 62 of the present invention is configured such that the through-holes 621 are formed by the wave-shaped side walls 622, the contact area between the mixed gas and the catalyst is maintained, and simultaneously the sectional area of the through-holes 621 can be enlarged. Specifically, as shown in FIG. 7A, in the conventional honeycomb type through-holes 621, the contact area between the mixed gas and the catalyst is equal to the sum of the lengths of the upper and lower walls 623 and the lengths of the side walls 622. Here, when the sum of the lengths of the upper and lower walls 623 is excluded because it is equal to the length (L) of the catalytic filter unit 62 of the present invention, the contact area corresponds to the sum '①+②+③+④' of the lengths of the side walls 622. In contrast, as shown in the upper side of FIG. 7B, in the wave-shaped through-holes 621 of the present invention, the contact area between the mixed gas and the catalyst is equal to the sum of the lengths of the upper and lower walls 623 and the lengths of the side walls 622. Here, when the sum of the lengths of the upper and lower walls 623 is excluded because it is equal to the length (L) of the conventional catalytic filter unit 62, the contact area corresponds to the sum 'ⓐ+ⓑ+ⓒ+ⓓ' of the lengths of the side walls 622. Therefore, it can be ascertained that the contact area of the through-holes 621 of the catalytic filter unit 62 of the present invention is larger than that of the through-holes 621 of the conventional catalytic filter unit 62. For this reason, as shown in the lower side of FIG. 7B, although the sectional area of the through-holes 621 of the catalytic filter unit 62 of the present invention is enlarged by moving the side walls 622 in the direction of arrows A and B, the contact area of the catalytic filter unit 62 of the present invention can be maintained such that it is the same as that of the conventional honeycomb type catalytic filter unit 62. According to the catalytic filter unit 62 of the present invention, since the pressure drop of the mixed gas passing through the through-holes 621 is decreased as the sectional area of the through-holes 621 is enlarged, the pressure drop thereof can be minimized although the length (L) of the catalytic filter unit is increased. Further, according to the catalytic filter unit 62 of the present invention, since the catalyst applied on the catalytic filter unit 62 increasingly comes into contact with the mixed gas as the length (L) of the catalytic filter unit is increased, noise is increasingly absorbed in the pores of the catalyst, and thus the noise-reducing effect and denitrification effect of the catalytic filter unit 62 are doubly increased in proportion to the increase in the length (L) of the catalytic filter unit 62.

The noise-reducing unit 63 is disposed at the rear side of the catalytic filter unit 62 in the reactor 6, serves to finally reduce the noise of the exhaust gas denitrified by the catalytic filter unit 62, and includes partitions 631.

The partitions 631 are disposed at the rear side of the catalytic filter unit 62 in the reactor 6 at regular intervals in parallel to the flow of the exhaust gas, and are configured to disperse the flow of the exhaust gas denitrified by the catalytic filter unit 62 and to absorb noise. Each of the partitions 631 includes a noise-absorbing member 6311 and support plates 6312 disposed on both sides of the noise-absorbing member 6311 to support the noise-absorbing member 6311. The front end of each of the partitions 631 has a semicircular or triangular shape in order to minimize the pressure drop of the denitrified exhaust gas introduced into the noise-reducing unit 63.

The noise-absorbing member 6311 is configured to absorb the noise of the denitrified exhaust gas passing through the noise-reducing unit 63. The noise-absorbing member 6311 may be made of various materials. For example, the noise-absorbing member 6311 may be made of mineral wool having excellent heat resistance and high noise-absorbing efficiency.

The support plates 6312 are disposed on both sides of the noise-absorbing member 6311, and serves to support the noise-absorbing member 6311. Each of the support plates 6312 is provided with a plurality of holes in order to allow the noise-absorbing member 6311 to effectively absorb the noise.

The noise-reducing unit 63 can effectively reduce the noise because the partitions 631 disperse the flow of the denitrified exhaust gas to form an eddy flow and to prevent the concentrated inflow of fluid, thereby preventing sound wave energy from increasing, and because the noise-absorbing member 6311 absorbs the noise. Since the noise of the mixed gas in the reactor 6 is reduced to some degree while the mixed gas passes through the catalytic filter unit 62, the volume of the noise-reducing unit 63 disposed at the rear side of the catalytic filter unit 63 can be minimized.

The control unit 8 is configured to control the exhaust gas denitrifying system having a noise-reduction structure according to the present invention. As described above, the control unit 8 functions to control the entire exhaust gas denitrifying system by adjusting the amount of the reductant supplied to the mixing chamber 5 depending on the nitrogen oxides measured by the output sensor 31.

The exhaust gas discharge unit 9 serves to discharge the denitrified and noise-reduced exhaust gas, and includes an analyzer 91. The analyzer 91 detects the nitrogen oxides existing in the denitrified exhaust gas discharged through the exhaust gas discharge unit 9 and then transfers the information to the control unit 8. The control unit 8 analyzes the information transferred by the analyzer 92 to determine whether or not the exhaust gas was denitrified in accordance with a predetermined standard.

The above-configured exhaust gas denitrifying system having a noise-reduction structure is characterized in that the catalytic filter unit 62 in the reactor 6 can reduce noise to some degree, so that the size of the noise-reducing unit 63 can be decreased, with the result that the size of the reactor 6 can be remarkably decreased compared to the size of a silencer of the conventional exhaust gas denitrifying system, thereby decreasing the size of the exhaust gas denitrifying system. Further, this exhaust gas denitrifying system having a noise-reduction structure is characterized in that the side walls 622 forming the through-holes 621 of the catalytic filter unit 62 are corrugated in the form of a wave, so that the space of the through-holes 621 can be enlarged while maintaining the contact area between the exhaust gas and a catalyst, thereby increasing a noise-reducing effect while minimizing the pressure drop of the exhaust gas. Further, this exhaust gas denitrifying system having a noise-reduction structure is characterized in that, unlike the conventional exhaust gas denitrifying system, high-temperature and high-pressure exhaust gas is directly introduced into the reactor 6 without passing through a silencer, thus improving the efficiency of denitrification. Furthermore, this exhaust gas denitrifying system having a noise-reduction structure is characterized in that noise is somewhat reduced by the catalytic filter unit 62, and then residual noise is finally reduced by the noise-reducing unit 63, so that the size of the exhaust gas denitrifying system can be decreased, with the result that the pressure drop of the exhaust gas can be minimized compared to the conventional exhaust gas denitrifying system, thereby increasing the efficiency of an engine and decreasing the consumption of fuel.

Figure 9:
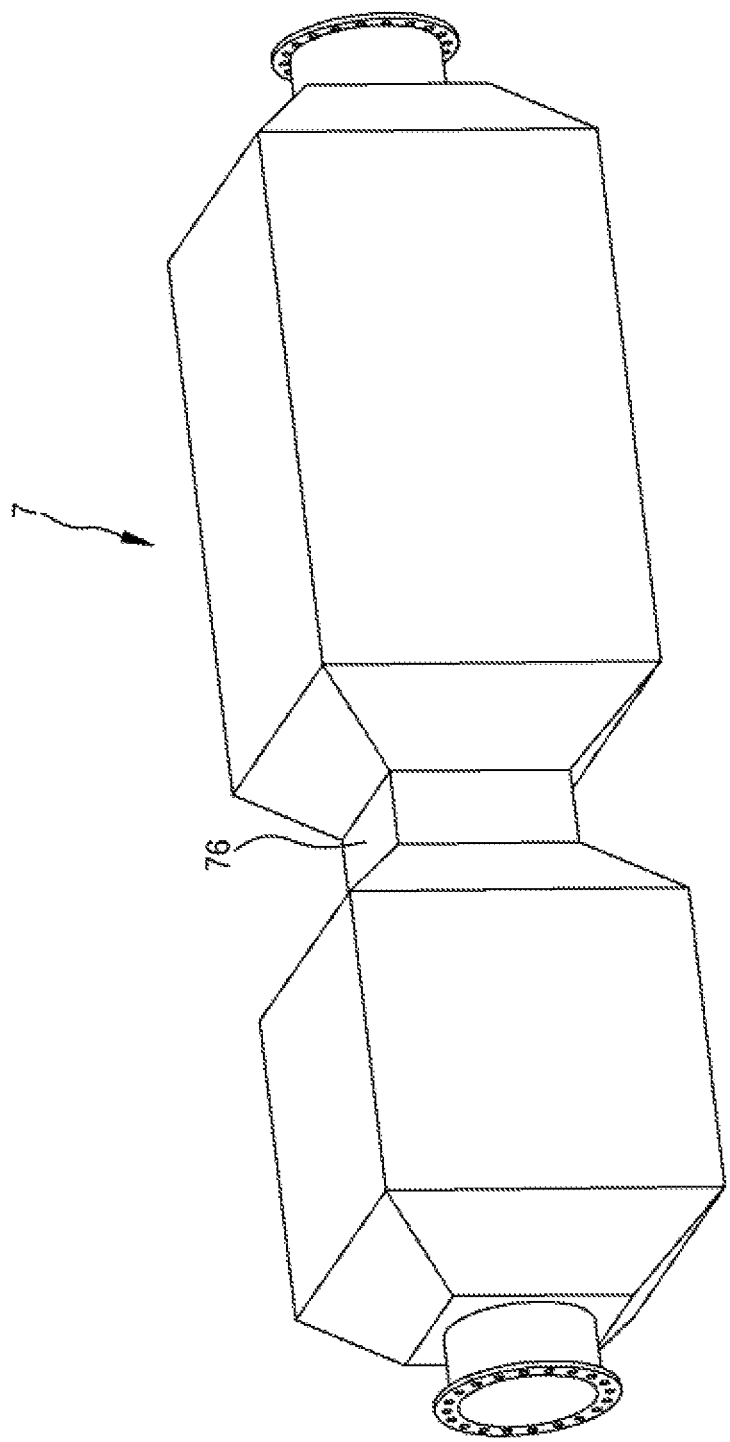
FIG. 9 is a perspective view of a reactor used in an exhaust gas denitrifying system having a noise-reduction structure according to another embodiment of the present invention.

FIG. 9 is a perspective view of a reactor 7 used in an exhaust gas denitrifying system having a noise-reduction structure according to another embodiment of the present invention. The reactor 7, unlike the reactor 6 explained with reference to FIGS. 2 to 8, further includes a connecting unit 76 that has a reduced diameter that is disposed between the catalytic filter unit and the noise-reducing unit. Since the reactor 7 is provided with the connecting unit 76, the denitrified exhaust gas having passed through the catalytic filter unit is contracted and expanded before it is introduced into the noise-reducing unit, so that sound wave energy is lost, with the result that the reactor 7 can reduce noise more effectively.

Figure 10B:
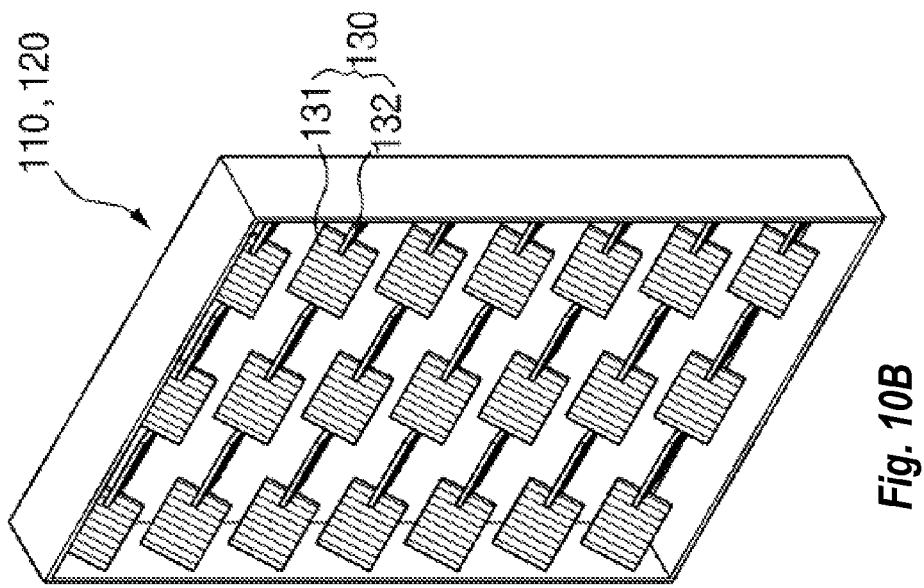
FIGS. 10A and 10B are perspective views of first and second mixers used in an exhaust gas denitrifying system having a noise-reduction structure according to still another embodiment of the present invention.
Figure 10A:
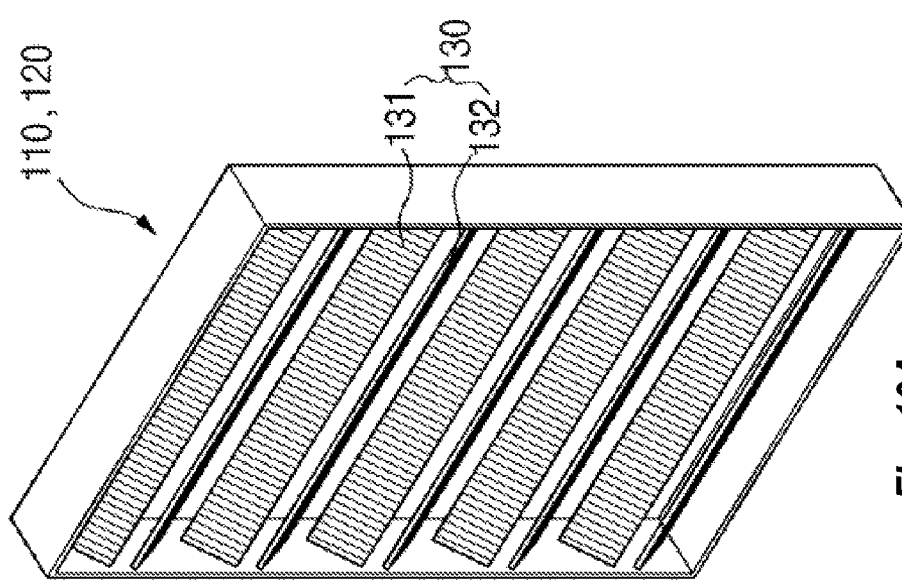
Figure 11:
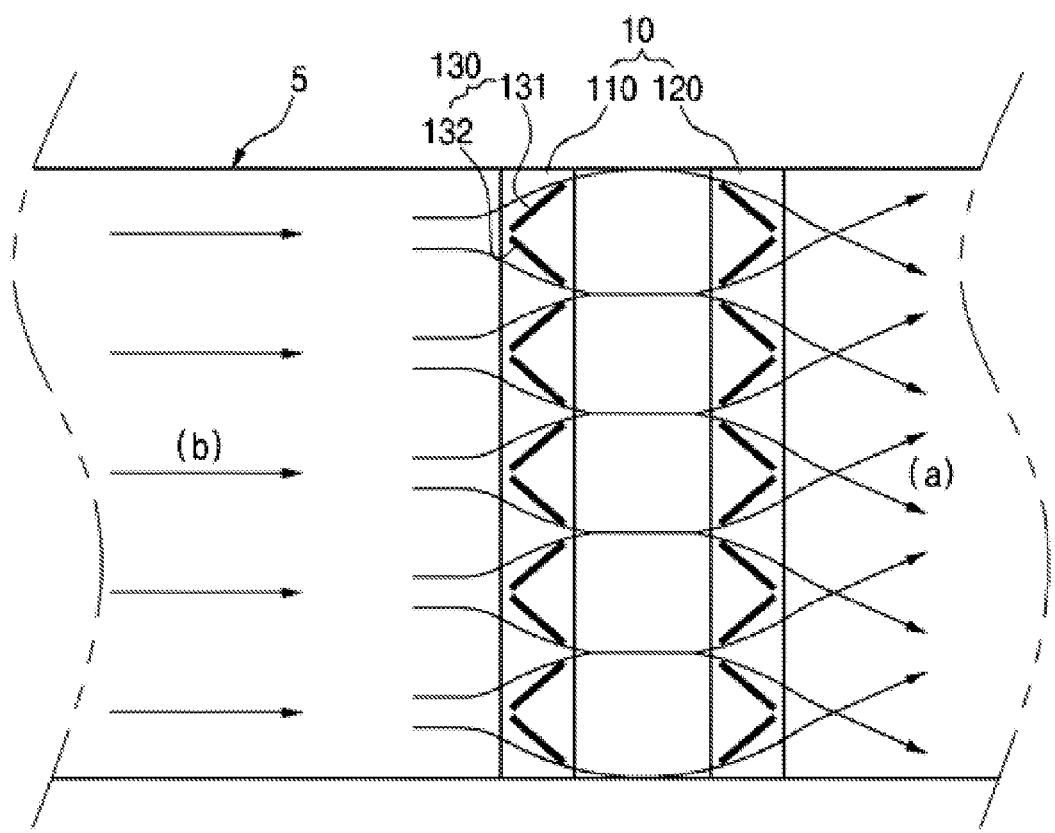
FIG. 11 is a schematic view of a multiplex mixer used in the exhaust gas denitrifying system having a noise-reduction structure according to still another embodiment of the present invention.
Figure 12:
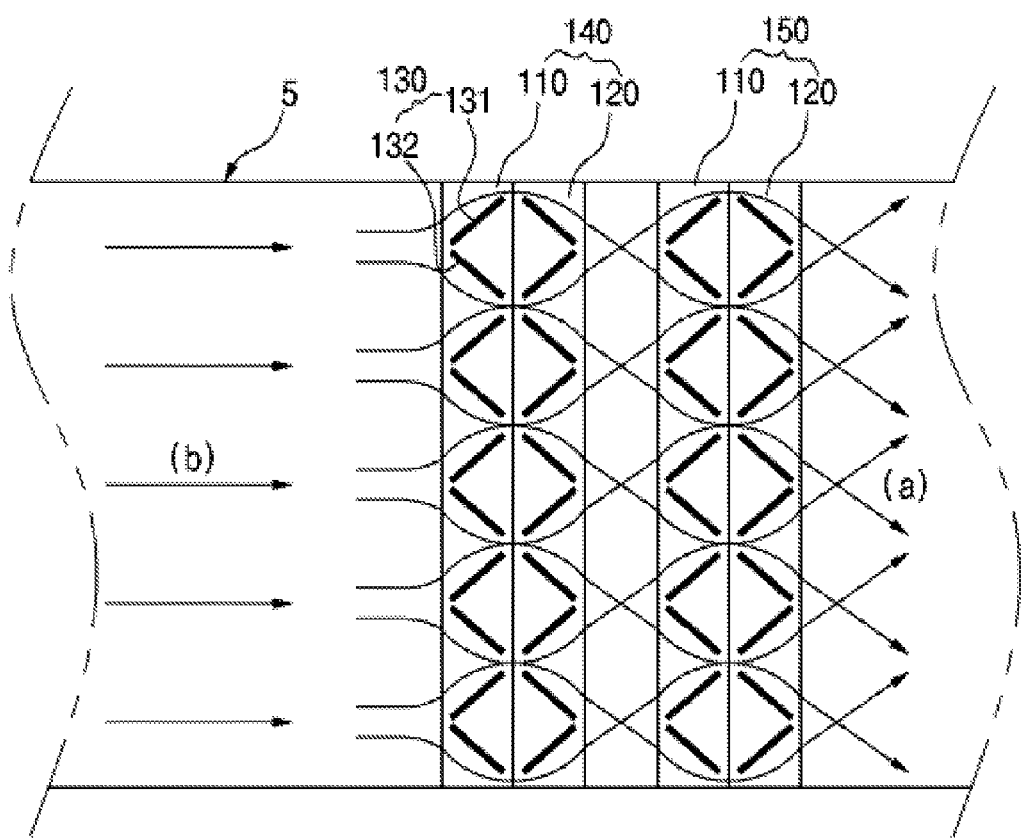
FIG. 12 is a schematic view of another multiplex mixer used in the exhaust gas denitrifying system having a noise-reduction structure according to still another embodiment of the present invention.
Figure 13:
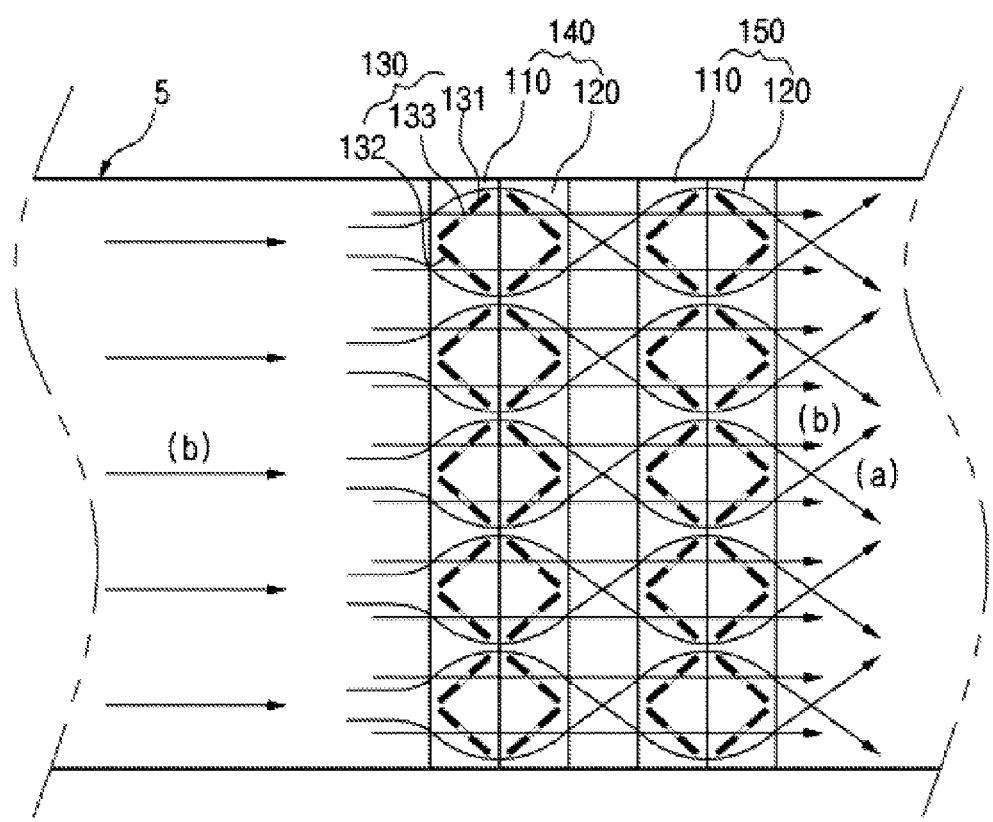
FIG. 13 is a schematic view of still another multiplex mixer used in the exhaust gas denitrifying system having a noise-reduction structure according to still another embodiment of the present invention.

FIGS. 10A and 10B are perspective views of first and second mixers used in an exhaust gas denitrifying system having a noise-reduction structure according to still another embodiment of the present invention, FIG. 11 is a schematic view of a multiplex mixer used in the exhaust gas denitrifying system having a noise-reduction structure according to still another embodiment of the present invention, FIG. 12 is a schematic view of another multiplex mixer used in the exhaust gas denitrifying system having a noise-reduction structure according to still another embodiment of the present invention, and FIG. 13 is a schematic view of still another multiplex mixer used in the exhaust gas denitrifying system having a noise-reduction structure according to still another embodiment of the present invention.

Hereinafter, a multiplex mixer used in the exhaust gas denitrifying system having a noise-reduction structure according to still another embodiment of the present invention will be described in more detail with reference to FIGS. 10A to 13.

The exhaust gas denitrifying system having a noise-reduction structure according to still another embodiment of the present invention includes a multiplex mixer 10 configured to mix a reductant with exhaust gas in the mixing chamber 5 within a short period of time. The multiplex mixer 10 includes a first mixer 110 and a second mixer 120, each of which is provided with a plurality of flow control plates 130. The plurality of flow control plates 130 include upstream flow control plates 131 inclined upwards and downstream flow control plates 132 inclined downwards, which are repetitively arranged.

The multiplex mixer 10 is configured to uniformly mix the reductant discharged from the injector 43 with exhaust gas, and, as described above, may include the first mixer 110 and the second mixer 120.

The first mixer 110 is sequentially disposed in parallel to the second mixer 120, and is configured to uniformly mix the reductant with exhaust gas within a short period of time by forming an eddy flow (a). As shown in FIGS. 10A to 11, the outer frame of the first mixer 110 includes a plurality of flow control plates 130.

The flow control plates 130 are configured to uniformly mix the reductant with exhaust gas within a short period of time by forming an eddy flow in the flow of the mixed gas of the reductant and exhaust gas. The flow control plates 130 may include upstream flow control plates 131 inclined upwards and downstream flow control plates 132 inclined downwards, which are repetitively arranged.

As shown in FIGS. 10A to 11, the upstream flow control plates 131 are inclined to the right and upwards at an angle of about 45°, and serve to form an eddy flow (a) by guiding the mixed gas of a reductant and exhaust gas to the right and upwards.

Further, as shown in FIGS. 10A to 11, the downstream flow control plates 132 are inclined to the left and downwards at an angle of about 45°, and serve to form an eddy flow (a) by guiding the mixed gas of a reductant and exhaust gas to the left and downwards. It is preferred that the upstream flow control plates 131 and the downstream flow control plates 132 be arranged repetitively and alternately.

The second mixer 120, having the same structure as the first mixer 110, is sequentially disposed in parallel to the first mixer 110, and is configured to uniformly mix the reductant with exhaust gas within a short period of time by forming an eddy flow (a). The upstream flow control plates 131 and downstream flow control plates 132 of the second mixer 120 have the same structure as the upstream flow control plates 131 and downstream flow control plates 132 of the first mixer 110. Preferably, as shown in FIG. 11, when the upstream flow control plates 131 and downstream flow control plates 132 of the second mixer 120 facing the upstream flow control plates 131 and downstream flow control plates 132 of the first mixer 110 are disposed at a slant in a direction opposite to those of the first mixer 110, the eddy flow (a) can be formed more effectively.

According to another embodiment of the present invention, the multiplex mixer 10 includes a first mixer module 140 and a second mixer module 150, each of which is formed by connecting the first mixer 110 with the second mixer 120. In each of the first mixer module 140 and the second mixer module 150, the flow control plates 130 of the first mixer 110 facing the flow control plates 130 of the second mixer 120 are disposed at a slant in a direction opposite to those of the second mixer 120.

As shown in FIG. 12, the first mixer module 140 is formed by connecting the first mixer 110 with the second mixer 120. Here, it is preferred that the flow control plates 130 of the first mixer 110 face the flow control plates 130 of the second mixer 120, and be disposed at a slant in a direction opposite to those of the second mixer 120. That is, when the first mixer module 140 is formed by sequentially connecting the first mixer 110 with the second mixer 120, the upstream flow control plates 131 of the first mixer 110 face the downstream flow control plates 132 of the second mixer 120, and the downstream flow control plates 132 of the first mixer 110 face the upstream flow control plates 131 of the second mixer 120, so that, as shown in FIG. 12, the eddy flow (a) formed by the mixed gas is larger and clearer after having passed through the first mixer module 140.

Since the second mixer module 150 has the same structure as the first mixer module 140, the description thereof will be omitted in order to avoid repetition. Since the second mixer module 150 is spaced apart from the first mixer module 140 by a predetermined interval, the eddy flow (a) formed by the first mixer module can be further extended by the second mixer module 150, thus uniformly mixing the mixed gas within a short period of time.

According to still another embodiment of the present invention, each of the flow control plates is provided with a plurality of center holes 133. In this case, a laminar flow (b) advances in a straight line through the center holes 133, and the laminar flow (b) is mixed with the eddy flow (a) advancing in a curved line through the flow control plates 130, thus increasing the mixing efficiency of a reductant and the exhaust gas.

The center holes 133 are holes formed at the centers of the flow control plates 130, that is, the upstream flow control plates 131 and the downstream flow control plates 132 such that the mixed gas passes through the holes. The center holes 133 may be formed along the center lines of the upstream flow control plates 131 and the downstream flow control plates 132. Owing to the formation of the center holes 133, as shown in FIG. 13, a part of the mixed gas colliding with the flow control plates 130 passes through the center holes 133 to form a laminar flow (b) advancing in a straight line, and the laminar flow (b) intersects the eddy flow (a) advancing in a curved line through the flow control plates 130, thus increasing the mixing efficiency of a reductant and exhaust gas.

According to this exhaust gas denitrifying system having a noise-reduction structure, including the mixing chamber 5 provided with the multiplex mixer 10, the mixing of a reductant and exhaust gas is more rapid and uniform because of the action of the multiplex mixer 10, so that the length of the mixing chamber 5 can be shortened, with the result that space can be efficiently used, thereby improving the efficiency of the installation and maintenance of the entire exhaust gas denitrifying system.

As described above, the exhaust gas denitrifying system having a noise-reduction structure according to the present invention is advantageous as follows.

The exhaust gas denitrifying system having a noise-reduction structure according to the present invention is advantageous in that it can denitrify exhaust gas and reduce noise using one reactor without providing a silencer.

Further, the exhaust gas denitrifying system having a noise-reduction structure according to the present invention is advantageous in that a catalytic filter unit in a reactor can reduce noise to some degree, so that the size of a noise-reducing unit can be decreased, with the result that the size of the reactor can be remarkably decreased compared to the size of a silencer of the conventional exhaust gas denitrifying system, thereby decreasing the size of the exhaust gas denitrifying system.

Further, the exhaust gas denitrifying system having a noise-reduction structure according to the present invention is advantageous in that side walls forming through-holes of a catalytic filter unit are formed in a wave shape, so that the space of the through-holes can be enlarged while maintaining the contact area between exhaust gas and a catalyst, thereby increasing a noise-reducing effect while minimizing the pressure drop of the exhaust gas.

Further, the exhaust gas denitrifying system having a noise-reduction structure according to the present invention is advantageous in that a plurality of partitions are disposed at the rear side of the catalytic filter unit in the reactor at regular intervals in a direction parallel to the flow of exhaust gas, so that the flow of the exhaust gas denitrified by the catalytic filter unit can be dispersed and the noise of the exhaust gas can be reduced, thereby increasing a noise-reducing effect.

Further, the exhaust gas denitrifying system having a noise-reduction structure according to the present invention is advantageous in that the denitrification reaction of exhaust gas is conducted prior to the reduction of noise unlike the conventional exhaust denitrifying system, so that high-temperature and high-pressure exhaust gas is denitrified, thereby improving the denitrification efficiency of exhaust gas.

Further, the exhaust gas denitrifying system having a noise-reduction structure according to the present invention is advantageous in that noise is partially reduced by a catalytic filter unit and then additionally reduced by a noise-reducing unit, so that the size of the exhaust gas denitrifying system can be decreased, with the result that the pressure drop of the exhaust gas passing through the exhaust gas denitrifying system can be minimized, thereby increasing the efficiency of an engine and decreasing the consumption of fuel.

Furthermore, the exhaust gas denitrifying system having a noise-reduction structure according to the present invention is advantageous in that it can overcome the problem of the conventional exhaust gas denitrifying system in that the length of the mixing chamber thereof must be kept long in order to secure the time and length sufficient for mixing a reductant with exhaust gas after spraying the reductant, and is advantageous in that the reductant can be mixed with exhaust gas in a short period of time, so that the length of the mixing chamber can be shortened, thereby efficiently maintaining the entire area of the exhaust gas denitrifying system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An exhaust gas denitrifying system having a noise-reduction structure, comprising:
   a reactor in which a chemical reaction that converts nitrogen oxides included in exhaust gas into nitrogen by denitrifying the nitrogen oxides using a catalyst takes place, the reactor comprising:
      a catalytic filter unit coated with a catalyst and provided with a plurality of through-holes through which exhaust gas passes;

a noise-absorbing material layer disposed in front of the catalytic filter unit and formed to a predetermined thickness along an inner surface of the reactor; and a noise-reducing unit for removing noise from the exhaust gas denitrified by the catalytic filter unit, the noise-reducing unit including a plurality of partitions disposed at a rear side of the catalytic filter unit in the reactor at regular intervals in parallel to the flow of the exhaust gas, wherein the plurality of partitions disperse the flow of the exhaust gas denitrified by the catalytic filter unit and absorb noise to improve a noise-reducing effect, each of the partitions including a noise-absorbing member for absorbing noise; and support plates disposed on both sides of the noise-absorbing member to support the noise-absorbing member and provided with a plurality of holes, whereby the reactor denitrifies the nitrogen oxides, and simultaneously reduces the noise, thus reducing the size of the exhaust gas denitrifying system.

2. The exhaust gas denitrifying system having a noise-reduction structure according to claim 1, wherein the catalytic filter unit includes wave-shaped side walls forming the through-holes, whereby the contact area between the exhaust gas and a catalyst is maintained, and simultaneously the space of the through-holes is enlarged, thus increasing a noise-reducing effect while minimizing a pressure drop of the exhaust gas.

3. The exhaust gas denitrifying system having a noise-reduction structure according to claim 1, wherein each of the partitions has a semicircular or triangular front end to minimize a pressure drop of the denitrified exhaust gas introduced into the noise-reducing unit.

4. The exhaust gas denitrifying system having a noise-reduction structure according to claim 1, wherein the noise-absorbing member is made of mineral wool.

5. The exhaust gas denitrifying system having a noise-reduction structure according to claim 1, further comprising: a mixing chamber for mixing a reductant with the exhaust gas and supplying the mixed gas to the reactor, wherein the mixing chamber includes a multiplex mixer for mixing the reductant with the exhaust gas within a short period of time, wherein the multiplex mixer includes a first mixer and a second mixer, each of which is provided with a plurality of flow control plates, and the plurality of flow control plates include upstream flow control plates inclined upwards and downstream flow control plates inclined downwards, which are repetitively arranged.

6. The exhaust gas denitrifying system having a noise-reduction structure according to claim 5, wherein the multiplex mixer includes a first mixer module and a second mixer module, each of which is formed by connecting the first mixer with the second mixer, wherein, in each of the first mixer module and the second mixer module, the flow control plates of the first mixer face the flow control plates of the second mixer, and are disposed at a slant in a direction opposite to those of the second mixer.

7. The exhaust gas denitrifying system having a noise-reduction structure according to claim 6, wherein each of the flow control plates is provided with a plurality of center holes through which a laminar flow advances in a straight line, whereby the laminar flow is mixed with an eddy flow advancing in a curved line through the flow control plates, thus increasing the mixing efficiency of a reductant and the exhaust gas.

* * * * *